United States Patent [19]

Kagoshima

[11] Patent Number: 5,675,693
[45] Date of Patent: Oct. 7, 1997

[54] VIDEO SIGNAL REPRODUCING APPARATUS WITH PLURAL SEARCH FUNCTIONS

[75] Inventor: Junichi Kagoshima, Kanagawa-ken, Japan

[73] Assignee: Victor Company Of Japan, Ltd., Yokohama, Japan

[21] Appl. No.: 588,485

[22] Filed: Jan. 18, 1996

[30] Foreign Application Priority Data

Jan. 19, 1995 [JP] Japan ..................... 7-024730

[51] Int. Cl.$^6$ ..................... H04N 5/76
[52] U.S. Cl. ............. 386/68; 386/111; 386/69; 386/70; 360/8
[58] Field of Search .................. 358/335, 342, 358/310; 360/33.1, 8, 9.1, 10.1; 386/46, 68, 69, 70, 109, 111; H04N 5/76

[56] References Cited

U.S. PATENT DOCUMENTS

| | | | |
|---|---|---|---|
| 5,140,437 | 8/1992 | Yonemitsu et al. | 358/335 |
| 5,377,051 | 12/1994 | Lane et al. | 360/33.1 |

FOREIGN PATENT DOCUMENTS

6268967  9/1994  Japan.

*Primary Examiner*—Khoi D. Truong
*Attorney, Agent, or Firm*—Lowe, Price, LeBlanc & Becker

[57] ABSTRACT

A recording medium stores video information representing frames including intra-coded frames which are spaced by intervals. A first device is operative for sequentially accessing different places on the recording medium and sequentially reproducing different segments of the video information therefrom. During a search, a second device is operative for detecting whether or not a first segment of the video information which is currently reproduced by the first device represents first one of the intra-coded frames. During the search and after the second device detects that the first segment of the video information represents the first one of the intra-coded frames, a third device is operative for jumping a place accessed by the first device to a given place on the recording medium and enabling the first device to reproduce a second segment of the video signal therefrom. The second segment represents second one of the intra-coded frames which differs from the first one of the intra-coded frames.

6 Claims, 9 Drawing Sheets

- ■ DEPRESSION OF STOP BUTTON
- ▶ DEPRESSION OF PLAY BUTTON
- ◀◀ DEPRESSION OF REVERSE SEARCH BUTTON
- ▶▶ DEPRESSION OF FORWARD SEARCH BUTTON
- → DEPRESSION OF FORWARD SCAN BUTTON
- ← DEPRESSION OF REVERSE SCAN BUTTON
- ❙❙ DEPRESSION OF PAUSE BUTTON 5,675,693

VIDEO SIGNAL REPRODUCING APPARATUS WITH PLURAL SEARCH FUNCTIONS

BACKGROUND OF THE INVENTION

1. Field of the Invention

This invention relates to an apparatus for reproducing a compressed video signal from a recording medium.

2. Description of the Prior Art

Video CD (compact disc) systems use compression of picture information in conformity with the international standard "ISO 11172 Video" which is generally called "MPEG-1". According to MPEG-1, frames represented by a compressed video signal include I frames, P frames, and B frames. Data representing each I frame results from an intra-frame encoding process. Data representing each P frame results from an inter-frame encoding process. Data representing each B frame results from a bi-directional predictive encoding process. Video CD's store such compressed video signals. A general reproducing apparatus for a video CD is changeable among different modes of operation which correspond to "play", "stop", "search", "pause", and others.

SUMMARY OF THE INVENTION

It is an object of this invention to provide an improved apparatus for reproducing a compressed video signal from a recording medium.

A first aspect of this invention provides an apparatus for a recording medium storing video information representing frames including intra-coded frames which are spaced by intervals, the apparatus comprising first means for sequentially accessing different places on the recording medium and sequentially reproducing different segments of the video information therefrom; second means for, during a search, detecting whether or not a first segment of the video information which is currently reproduced by the first means represents first one of the intra-coded frames; and third means for, during the search and after the second means detects that the first segment of the video information represents the first one of the intra-coded frames, jumping a place accessed by the first means to a given place on the recording medium and enabling the first means to reproduce a second segment of the video signal therefrom, the second segment representing second one of the intra-coded frames which differs from the first one of the intra-coded frames.

A second aspect of this invention is based on the first aspect thereof, and provides an apparatus wherein an amount of the jumping of the place accessed by the accessing means corresponds to a given integer times the intervals between the intra-coded frames.

A third aspect of this invention is based on the first aspect thereof, and provides an apparatus further comprising a button, fourth means for detecting a number of times of depression of the button during a given length of time, and fifth means for changing the given integer in response to the detected number of times.

A fourth aspect of this invention is based on the first aspect thereof, and provides an apparatus further comprising fourth means for thinning out the segments of the video information which are reproduced by the first means.

A fifth aspect of this invention provides an apparatus for a recording medium storing video information representing frames including intra-coded frames and non-intra-coded frames, the intra-coded frames being spaced by intervals, the non-intra-coded frames differing from the intra-coded frames, the apparatus comprising first means for sequentially accessing different places on the recording medium and sequentially reproducing different segments of the video information therefrom; second means for, during a search, detecting whether or not a first segment of the video information which is currently reproduced by the first means represents first one of the intra-coded frames; third means for, during the search and after the second means detects that the first segment of the video information represents the first one of the intra-coded frames, enabling the first means to reproduce at least one second segment of the video information which represents a non-intra-coded frame adjacent to the first one of the intra-coded frames; and fourth means for, during the search and after the first means reproduce the second segment of the video information which represent the non-intra-coded frames adjacent to the first one of the intra-coded frames, jumping a place accessed by the first means to a given place on the recording medium and enabling the first means to reproduce a third segment of the video signal therefrom, the third segment representing second one of the intra-coded frames which differs from the first one of the intra-coded frames.

DESCRIPTION OF THE PREFERRED EMBODIMENTS

First Embodiment

A video CD (compact disc) and a DVD (digital video disc) store video data and audio data which result from compressively encoding processes in conformity with MPEG-1 and MPEG-2. The video data and the audio data are generally referred to as MPEG video and MPEG audio respectively.

A sync signal, a header signal, and a sub header signal are recorded on a leading part of each sector of the video CD or the DVD. Main data representing video information or audio information is recorded on a region in the sector which follows the leading part thereof.

Figure 1:
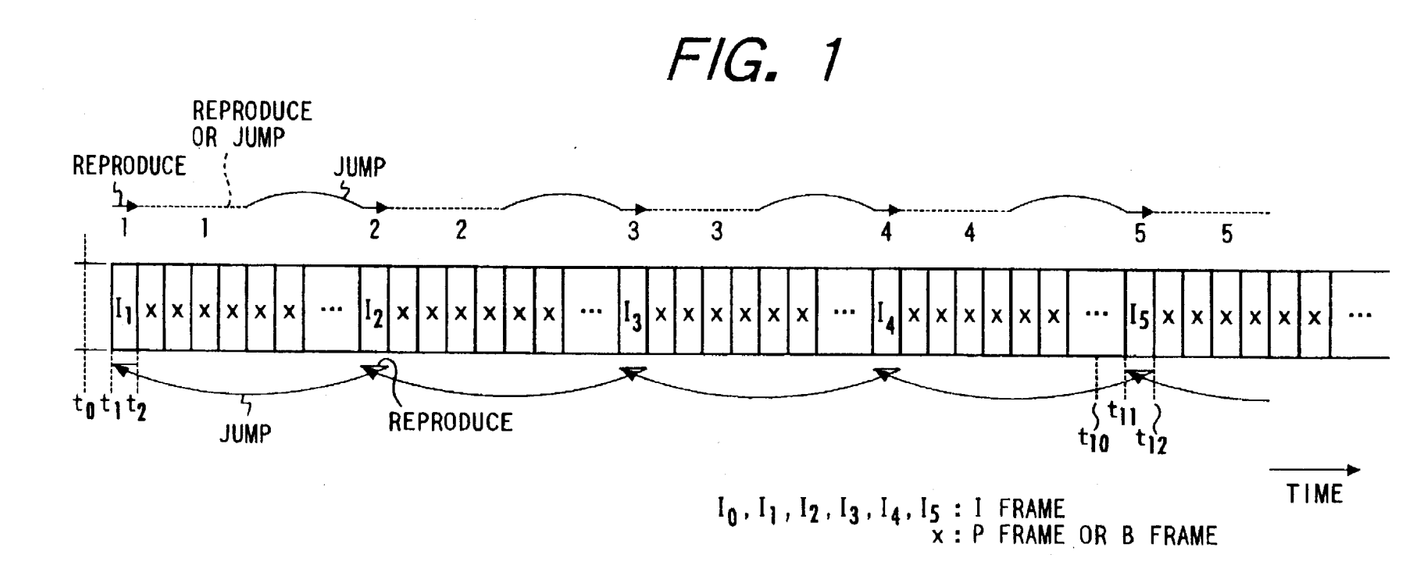
FIG. 1 is a time-domain diagram of a sequence of frames represented by an MPEG video signal.

FIG. 1 shows the data format of MPEG video. With reference to FIG. 1, the MPEG video represents a sequence of frames (pictures) in which I frames, P frames, and B frames are arranged in a given pattern. Data representing each I frame results from an intra-frame encoding process. Data representing each P frame results from an inter-frame encoding process. Data representing each B frame results from a bi-directional predictive encoding process. The I frames are also referred to as the I pictures or the intra-coded pictures. The P frames are also referred to as the P pictures or the predictive-coded pictures. The B frames are also referred to as the B pictures or the bi-directionally predictive-coded pictures.

As shown in FIG. 1, the I frames are arranged at given intervals. Plural P frames and plural B frames are located between two adjacent I frames. The P frames and the B frames are arranged in a desired pattern which can be decided during the recording of information on the video CD or the DVD. With reference to FIG. 1, I frames $I_1, I_2, I_3, I_4$, ... sequentially follow an I frame $I_0$ in a normal time-base direction. Now, I frames sequentially preceding the I frame $I_0$ are denoted by $I_{-1}, I_{-2}, I_{-3}, I_{-4}, \ldots$ respectively. Thus, the I frames $I_1, I_2, I_3, I_4, \ldots$ are sequentially arranged in a reverse time-base direction.

Figure 2:
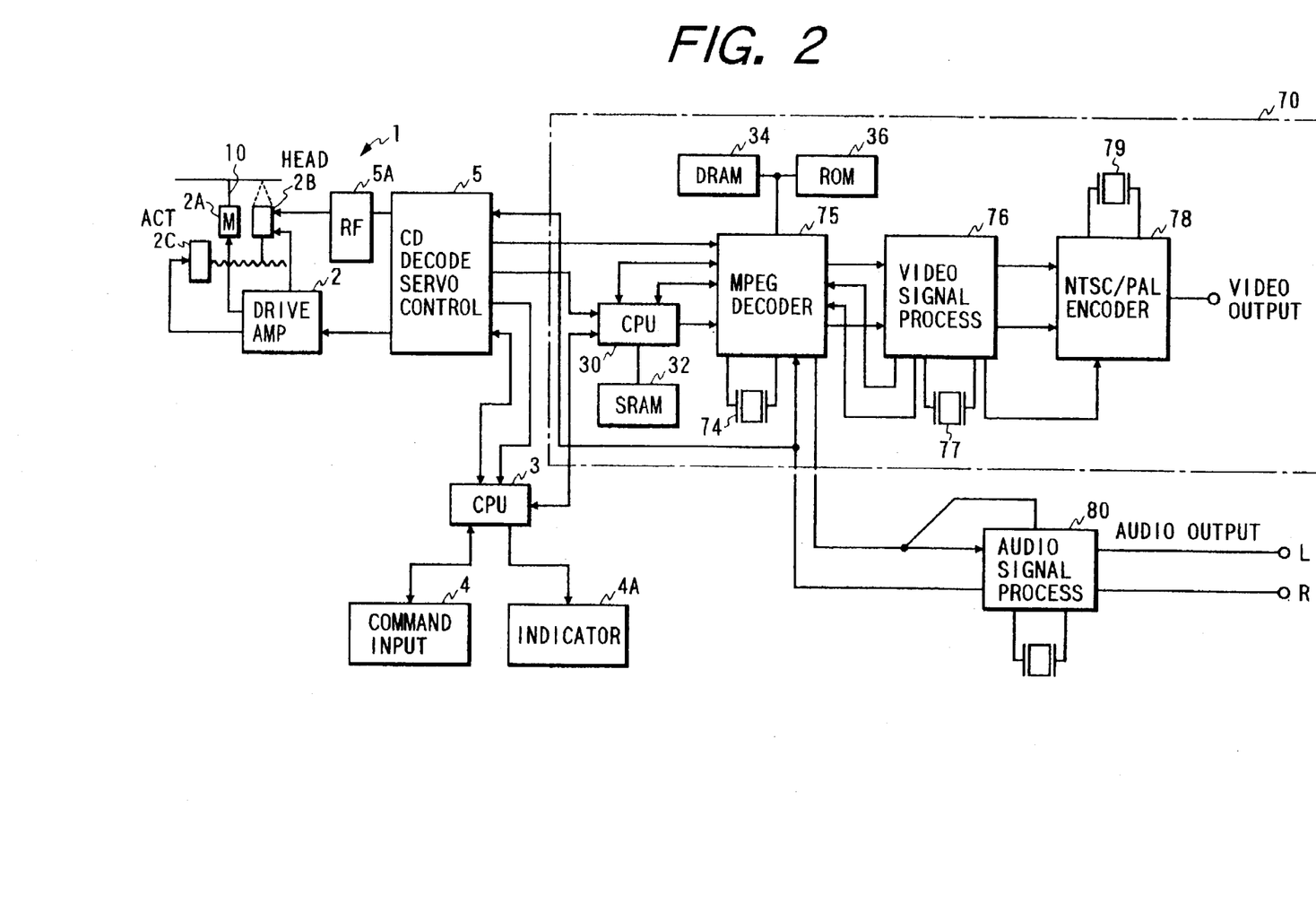
FIG. 2 is a block diagram of a reproducing apparatus according to a first embodiment of this invention.

With reference to FIG. 2, a reproducing apparatus includes a CD player 1 which has a spindle motor 2A, an optical pickup head 2B, an actuator 2C for the optical pickup head 2B, and a drive amplifier 2. The spindle motor 2A serves to rotate a spindle 10. A video CD placed in position within the CD player 1 rotates as the spindle 10 rotates. Generally, the video CD remains rotated at a constant linear velocity (CLV) while being driven. The drive amplifier 2 is electrically connected to the spindle motor 2A, the optical pickup head 2B, and the head actuator 2C.

The CD player 1 also has a CPU 3, a command input section 4, an indicator 4A, a CD decoder/servo control circuit 5, and an RF section 5A. The RF section 5A is electrically connected between the optical pickup head 2B and the CD decoder/servo control circuit 5. The CD decoder/servo control circuit 5 is electrically connected to the drive amplifier 2 and the CPU 3. The CPU 3 is electrically connected to the command input section 4 and the indicator 4A.

It should be noted that the CD player 1 may be replaced by a DVD player. In this case, a DVD is used instead of the video CD.

Operation of the reproducing apparatus of FIG. 2 is changeable among different modes such as "play", "stop", "search", and "pause". As will be described later, there are different search modes of operation. The command input section 4 has keys for designating the different modes of operation of the reproducing apparatus respectively. The keys in the command input section 4 can be operated by a user.

The reproducing apparatus of FIG. 2 also includes a signal processing and video reproducing section 70 and an audio signal processing circuit 80. The signal processing and video reproducing section 70 is connected to the CD decoder/servo control circuit 5 and the CPU 3. The audio signal processing circuit 80 is connected to the CD decoder/servo control circuit 5 and the signal processing and video reproducing section 70.

The signal processing and video reproducing section 70 includes a CPU 30, an SRAM 32, a DRAM 34, a ROM 36, an MPEG decoder 75, a video signal processing circuit 76, an NTSC/PAL encoder 78, and crystal resonators 74, 77, and 79. The SRAM 32 may be omitted. The CPU 30 is connected to the CPU 3, the CD decoder/servo control circuit 5, the SRAM 32, and the MPEG decoder 75. The DRAM 34 and the ROM 36 are connected to the MPEG decoder 75. The video signal processing circuit 76 is connected between the MPEG decoder 75 and the NTSC/PAL encoder 78. The crystal resonator 74 is connected to the MPEG decoder 75 for generating a fixed-frequency clock signal in the MPEG decoder 75. The crystal resonator 77 is connected to the video signal processing circuit 76 for generating a fixed-frequency clock signal in the video signal processing circuit 76. The crystal resonator 79 is connected to the NTSC/PAL encoder 78 for generating a fixed-frequency clock signal in the NTSC/PAL encoder 78. The MPEG decoder 75 is connected to the CD decoder/servo control circuit 5 and the audio signal processing circuit 80. The video signal processing circuit 76 includes an interface, a D/A converter, and a sync signal generator.

The audio signal processing circuit 80 is connected to the CD decoder/servo control circuit 5 and the MPEG decoder 75. The audio signal processing circuit 80 includes a digital filter and a D/A converter.

A signal having video information and audio information is reproduced from a video CD by the optical pickup head 2B. The reproduced signal is transmitted from the optical pickup head 2B to the CD decoder/servo control circuit 5 via the RF section 5A. The reproduced signal is subjected by the CD decoder/servo control circuit 5 to a CD decoding process inverse with respect to a CD encoding process. The resultant reproduced signal is fed from the CD decoder/servo control circuit 5 to the MPEG decoder 75, being subjected by the MPEG decoder 75 to an MPEG decoding process inverse with respect to an MPEG encoding process. The MPEG decoding process recovers original video information and original audio information from the reproduced signal fed to the MPEG decoder 75. The recovered video information is transmitted from the MPEG decoder 75 to the NTSC/PAL encoder 78 via the video signal processing circuit 76. The video information is encoded by the NTSC/PAL encoder 78 into a video signal of an NTSC format or a PAL format. The video signal of the NTSC format or the PAL format is transmitted from the NTSC/PAL encoder 78 to an external device (not shown) as an output video signal from the reproducing apparatus of FIG. 2. The recovered audio information is transmitted from the MPEG decoder 75 to the audio signal processing circuit 80. The audio information is converted and separated by the audio signal processing circuit 80 into a left-channel audio signal and a right-channel audio signal. The left-channel audio signal and the right-channel audio signal are transmitted from the audio signal processing circuit 80 to an external device (not shown) as output audio signals from the reproducing apparatus of FIG. 2.

The CPU 3 has a combination of an input/output port, a processing section, a ROM, and a RAM. The CPU 3 operates in accordance with a program (a control program) stored in the internal ROM. Similarly, the CPU 30 has a combination of an input/output port, a processing section, a ROM, and a RAM. The CPU 30 operates in accordance with a program (a control program) stored in the internal ROM.

Operation of the reproducing apparatus of FIG. 2 is changeable among different modes including three different search modes (first, second, and third search modes). One of the first, second, and third search modes of operation is selected and designated by operating the command input section 4. Specifically, the CPU 3 generates a search-mode selection signal in response to operation of the command input section 4. The search-mode selection signal represents which of the first, second, and third search modes of operation is selected. The CPU 3 outputs the search-mode selection signal to the CPU 30.

The CPU 3 receives information of a jump destination address from the CPU 30. The CPU 3 generates and outputs a control signal to the CD decoder/servo control circuit 5 in response to the information of the jump destination address. The CD decoder/servo control circuit 5 adjusts the head actuator 2C via the drive amplifier 2 in response to the control signal from the CPU 3 so that the optical pickup head 2B jumps from the current position to a new position corresponding to the jump destination address. As a result of the jump, a position on the video CD which corresponds to the jump destination address is accessed and scanned by the optical pickup head 2B.

The control program for the CPU 30 has first, second, and third segments (sub routines) corresponding to the first, second, and third search modes of operation respectively. One of the first, second, and third program segments is selected and executed in response to the search-mode selection signal fed from the CPU 3. The selection of one of the first, second, and third program segments is executed according to a main routine of the control program for the CPU 30. The CPU 30 controls the MPEG decoder 75. The MPEG decoder 75 can be an IC chip for processing an MPEG signal. An example of the IC chip is "CL 480" produced by Kubota C-CUBE. The IC chip includes a decoder and a memory. The MPEG decoder 75 subjects every frame-corresponding data piece to a decoding process, and detects the type of every frame. The MPEG decoder 75 transmits information of the detected type of every frame to the CPU 30.

Figure 3:
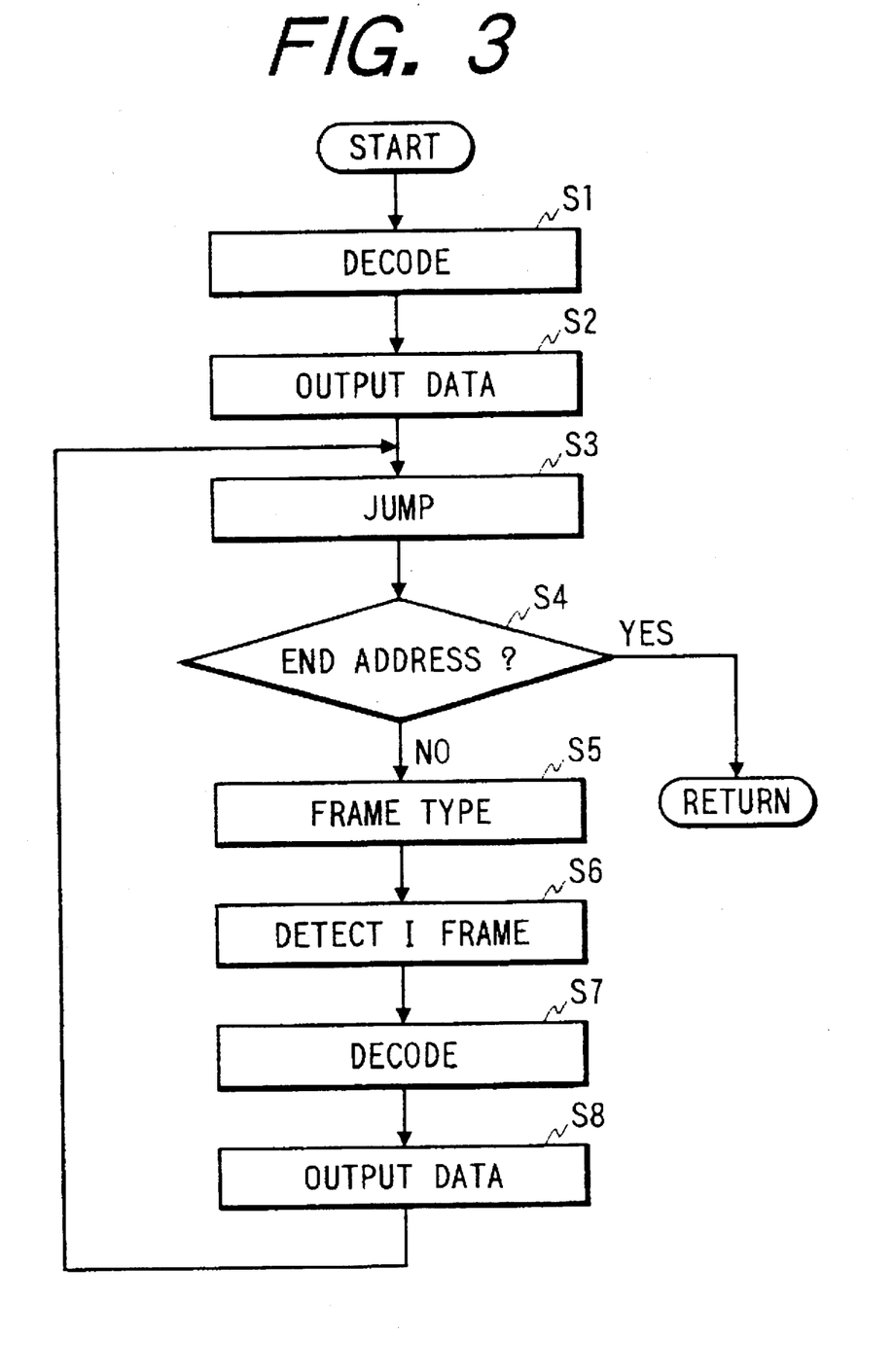
FIG. 3 is a first segment of a program for controlling a CPU in FIG. 2.

FIG. 3 is a flowchart of the first segment of the program for controlling the CPU 30. The first program segment corresponds to the first search mode of operation. The first search mode of operation agrees with a search in a normal direction (a forward playback direction), and relates to only I frames.

As shown in FIG. 3, a first step S1 of the program segment controls the MPEG decoder 75 to decode the reproduced signal representing the current frame (the current address). A step S2 following the step S1 controls the MPEG decoder 75 to write the decoding-resultant data into the memory within the MPEG decoder 75. The step S2 controls the MPEG decoder 75 so that the decoding-resultant data will be outputted from the memory to the video signal processing circuit 76 (or the audio signal processing circuit 80). After the step S2, the program advances to a step S3.

The step S3 sets a jump destination address which follows the current address by a given address interval. The jump destination address corresponds to a position on the video CD which exists outward of the current address position. The given address interval corresponds to a time N equal to or slightly shorter than one of integral multiples of the interval at which adjacent I frames are spaced during normal-speed playback. For example, the time N is substantially equal to or slightly shorter than one of 0.5 second, 1.0 second, 1.5 seconds, 2.0 seconds, ... in the case where the interval between adjacent I frames is 0.5 second. Specifically, an address value corresponding to the time N is added to the current address so that the jump destination address is determined. The step S3 sets the time N in response to the search-mode selection signal fed from the CPU 3. The step S3 informs the CPU 3 of the jump destination address. As a result, the CPU 3 generates and outputs a control signal to the CD decoder/servo control circuit 5 in response to the information of the jump destination address. Therefore, as previously described, the optical pickup head 2B is jumped from the current position to a new position corresponding to the jump destination address. Thus, a position on the video CD which corresponds to the jump destination address is accessed and scanned by the optical pickup head 2B.

A step S4 following the step S3 decides whether or not the jump destination address exceeds an end address. When the jump destination address does not exceed the end address, the program advances from the step S4 to a step S5. When the jump destination address exceeds the end address, the program exits from the step S4 and then returns to the main routine.

The step S5 receives information of the type of the current frame from the MPEG decoder 75. Specifically, pack data following a pack header contains information of an identification code for picture encoding types (frame encoding types, that is, I, P, and B types). The identification code information represents which of an I frame, a P frame, and a B frame the present frame corresponds to. The identification code information is used as the information of the type of the current frame.

A step S6 following the step S5 decides whether or not the current frame is an I frame by referring to the information of the type of the current frame. The step S6 waits until the current frame becomes an I frame. When the current frame becomes an I frame, the program advances from the step S6 to a step S7.

The step S7 controls the MPEG decoder 75 to decode the reproduced signal representing the current frame (the I frame). A step S8 following the step S7 controls the MPEG decoder 75 to write the decoding-resultant data into the memory within the MPEG decoder 75. The step S8 controls the MPEG decoder 75 so that the decoding-resultant data will be repetitively outputted from the memory to the video signal processing circuit 76 (or the audio signal processing circuit 80). After the step S8, the program returns to the step S3. During the next jump executed by the step S3, the last decoding-resultant data continues to be repetitively outputted from the memory to the video signal processing circuit 76 (or the audio signal processing circuit 80).

With reference to FIGS. 1 and 3, at a moment $t_1$, an I frame $I_1$ is detected by the step S6. At a moment $t_2$ following the moment $t_1$, the MPEG decoder 75 decodes the reproduced signal representing the I frame $I_1$ (the step S7). The decoding-resultant data is written into the memory within the MPEG decoder 75, and the decoding-resultant data is repetitively outputted from the memory to the video signal processing circuit 76 (the step S8). A jump destination address is calculated, and the optical pickup head 2B is jumped to a position immediately preceding the position corresponding jump destination address (the step S3). Subsequently, a next I frame $I_2$ is detected by the step S6 in the case where the jump-related time N corresponds to the interval between adjacent I frames. Then, the above-indicated processes are repeated. In this way, the recovered video information outputted from the MPEG encoder 75 except a start of the search represents only a sequence of I frames $I_1$, $I_2$, $I_3$, $I_4$, ... when the jump-related time N corresponds to the interval between adjacent I frames.

Figure 4:
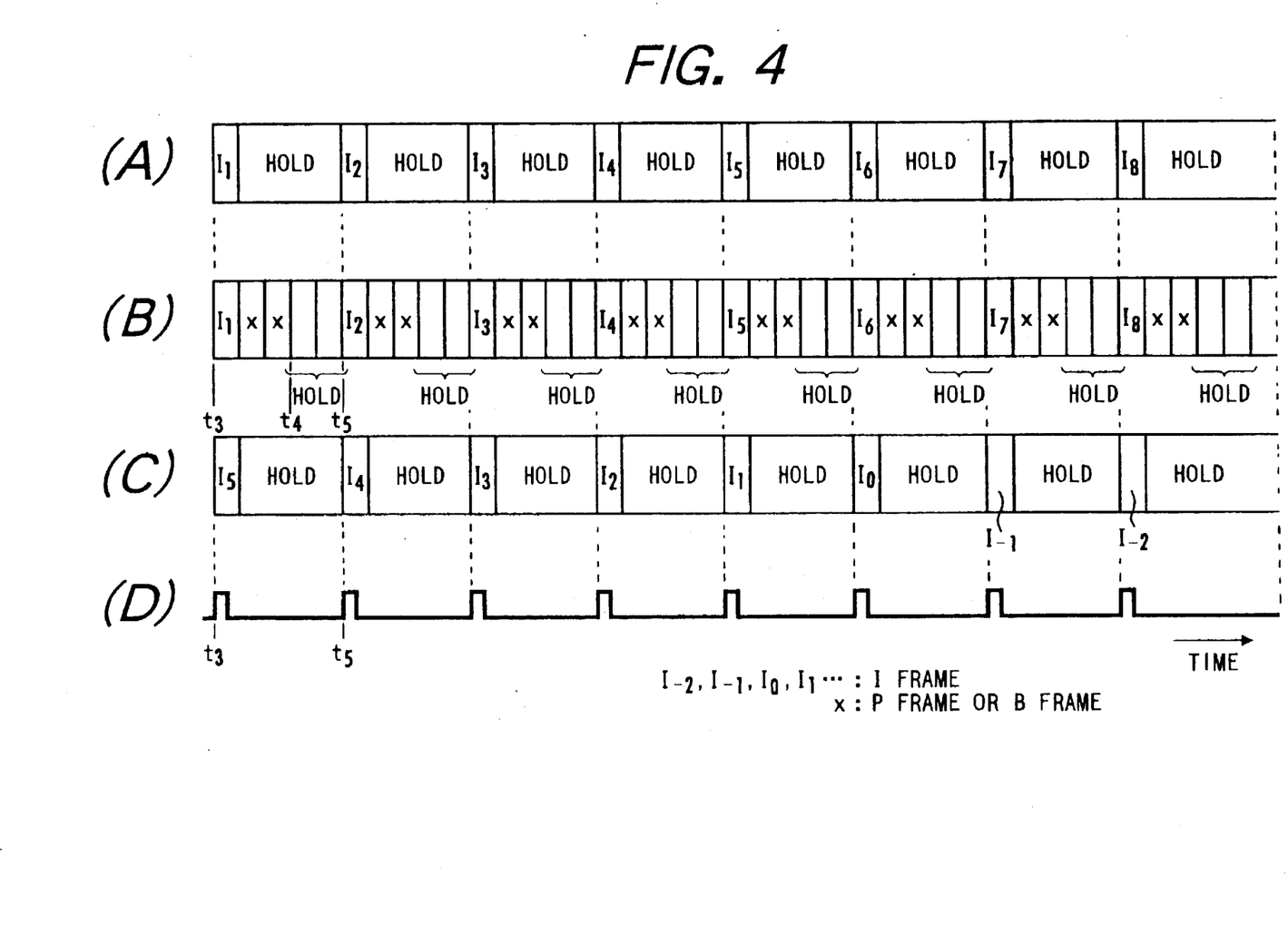
FIG. 4 is a time-domain diagram of conditions of data outputted from an MPEG decoder in FIG. 2, and a fixed-frequency pulse signal.

With reference to the portions (A) and (D) of FIG. 4, the updating of the contents of the data outputted from the memory within the MPEG decoder 75 to the video signal processing circuit 76 is controlled by a fixed-frequency pulse signal having a given period equal to, for example, 0.25 second. Specifically, the updating of the data is executed at every timing (for example, a moment $t_3$ and a moment $t_5$) determined by the fixed-frequency pulse signal. The fixed-frequency pulse signal has a waveform such has shown in the portion (D) of FIG. 4. The return from the step S8 to the step S3 is synchronized with the fixed-frequency pulse signal. As shown in the portions (A) and (D) of FIG. 4, each new-I-frame data appears at every timing determined by the fixed-frequency pulse signal. In the portion (A) of FIG. 4, the last-I-frame data continues to be repetitively outputted during each of time intervals denoted by "HOLD".

In the case where the jump-related time N corresponds to twice the interval between adjacent I frames, the recovered video information outputted from the MPEG encoder 75 except a start of the search represents only a sequence of alternate I frames $I_1$, $I_3$, $I_5$, . . . . In the case where the jump-related time N corresponds to three times the interval between adjacent I frames, the recovered video information outputted from the MPEG encoder 75 except a start of the search represents only a sequence of I frames $I_1$, $I_4$, $I_7$, . . . .

Figure 5:
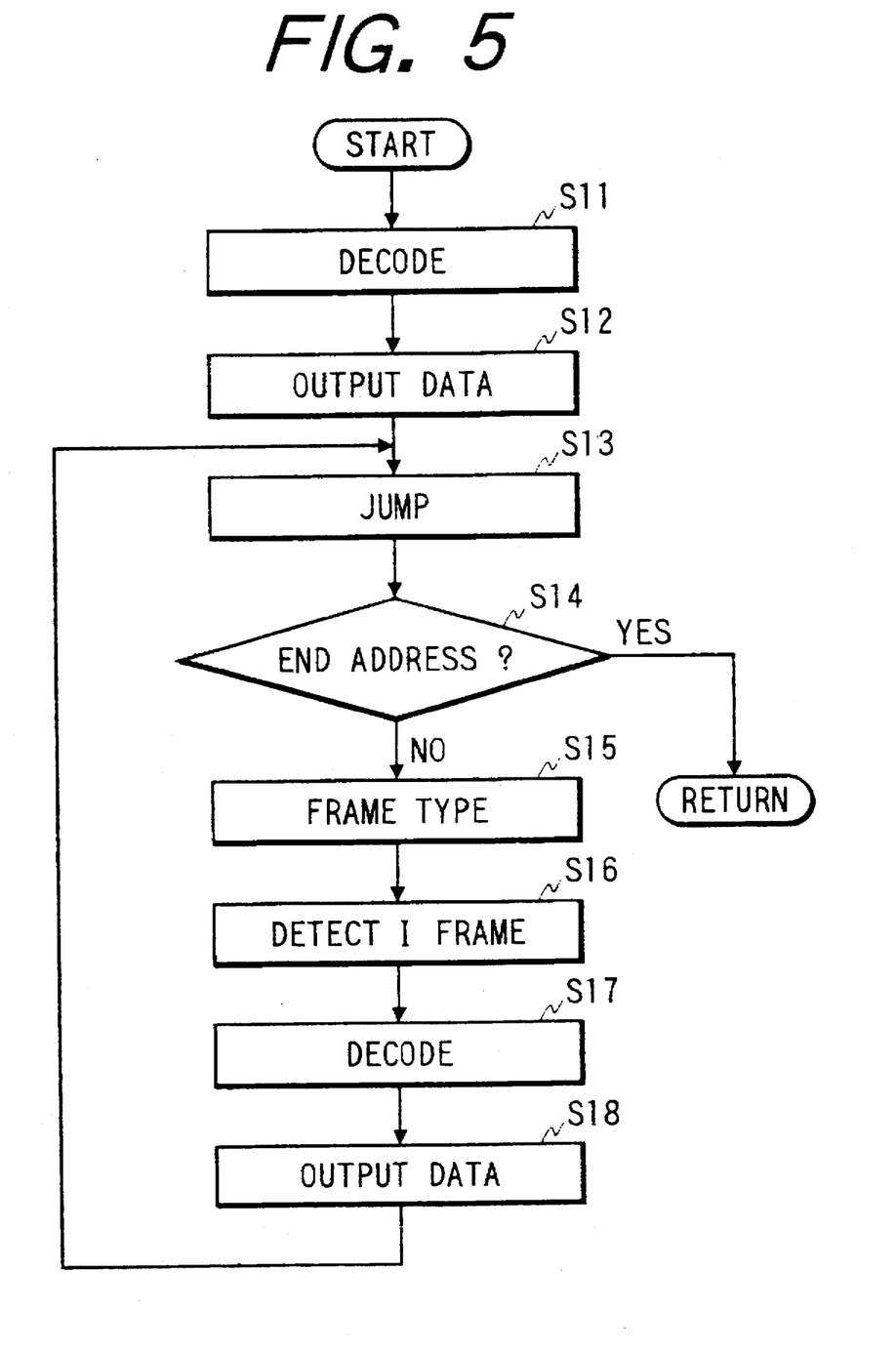
FIG. 5 is a second segment of the program for controlling the CPU in FIG. 2.

FIG. 5 is a flowchart of the second segment of the program for controlling the CPU 30. The second program segment corresponds to the second search mode of operation. The second search mode of operation agrees with a search in a reverse direction (opposite the forward or normal playback direction), and relates to only I frames.

As shown in FIG. 5, a first step S11 of the program segment controls the MPEG decoder 75 to decode the reproduced signal representing the current frame (the current address). A step S12 following the step S11 controls the MPEG decoder 75 to write the decoding-resultant data into the memory within the MPEG decoder 75. The step S12 controls the MPEG decoder 75 so that the decoding-resultant data will be outputted from the memory to the video signal processing circuit 76 (or the audio signal processing circuit 80). After the step S12, the program advances to a step S13.

The step S13 sets a jump destination address which precedes the current address by a given address interval. The jump destination address corresponds to a position on the video CD which exists inward of the current address position. The given address interval corresponds to a time NR equal to or slightly longer than one of integral multiples of the interval between adjacent I frames. For example, the time NR is substantially equal to or slightly longer than one of 0.5 second, 1.0 second, 1.5 seconds, 2.0 seconds, . . . in the case where the interval between adjacent I frames is 0.5 second. Specifically, an address value corresponding to the time NR is subtracted from the current address so that the jump destination address is determined. The step S13 sets the time NR in response to the search-mode selection signal fed from the CPU 3. The step S13 informs the CPU 3 of the jump destination address. As a result, the CPU 3 generates and outputs a control signal to the CD decoder/servo control circuit 5 in response to the information of the jump destination address. Therefore, as previously described, the optical pickup head 2B is jumped from the current position to a new position corresponding to the jump destination address. Thus, a position on the video CD which corresponds to the jump destination address is accessed and scanned by the optical pickup head 2B.

A step S14 following the step S13 decides whether or not the jump destination address is beyond an end address. When the jump destination address is not beyond the end address, the program advances from the step S14 to a step S15. When the jump destination address is beyond the end address, the program exits from the step S14 and then returns to the main routine.

The step S15 receives information of the type of the current frame from the MPEG decoder 75. A step S16 following the step S15 decides whether or not the current frame is an I frame by referring to the information of the type of the current frame. The step S16 waits until the current frame becomes an I frame. When the current frame becomes an I frame, the program advances from the step S16 to a step S17.

The step S17 controls the MPEG decoder 75 to decode the reproduced signal representing the current frame (the I frame). A step S18 following the step S17 controls the MPEG decoder 75 to write the decoding-resultant data into the memory within the MPEG decoder 75. The step S18 controls the MPEG decoder 75 so that the decoding-resultant data will be repetitively outputted from the memory to the video signal processing circuit 76 (or the audio signal processing circuit 80). After the step S18, the program returns to the step S13. During the next jump executed by the step S13, the last decoding-resultant data continues to be repetitively outputted from the memory to the video signal processing circuit 76 (or the audio signal processing circuit 80).

With reference to FIGS. 1 and 5, at a moment $t_{11}$, an I frame $I_5$ is detected by the step S16. At a moment $t_{12}$ following the moment $t_{11}$, the MPEG decoder 75 decodes the reproduced signal representing the I frame $I_5$ (the step S17). The decoding-resultant data is written into the memory within the MPEG decoder 75, and the decoding-resultant data is repetitively outputted from the memory to the video signal processing circuit 76 (the step S18). A jump destination address is calculated, and the optical pickup head 2B is jumped to a position immediately preceding the position corresponding jump destination address (the step S13). Subsequently, an immediately-preceding I frame $I_4$ is detected by the step S16 in the case where the jump-related time NR corresponds to the interval between adjacent I frames. Then, the above-indicated processes are repeated. In this way, the recovered video information outputted from the MPEG encoder 75 except a start of the search represents only a sequence of I frames $I_5$, $I_4$, $I_3$, $I_2$, . . . when the jump-related time NR corresponds to the interval between adjacent I frames.

With reference to the portions (C) and (D) of FIG. 4, the updating of the contents of the data outputted from the memory within the MPEG decoder 75 to the video signal processing circuit 76 is controlled by a fixed-frequency pulse signal having a given period equal to, for example, 0.25 second. Specifically, the updating of the data is executed at every timing (for example, a moment $t_3$ and a moment $t_5$) determined by the fixed-frequency pulse signal. The fixed-frequency pulse signal has a waveform such has shown in the portion (D) of FIG. 4. The return from the step S18 to the step S13 is synchronized with the fixed-frequency pulse signal. As shown in the portions (C) and (D) of FIG. 4, each new-I-frame data appears at every timing determined by the fixed-frequency pulse signal. In the portion (C) of FIG. 4, the last-I-frame data continues to be repetitively outputted during each of time intervals denoted by "HOLD".

In the case where the jump-related time NR corresponds to twice the interval between adjacent I frames, the recovered video information outputted from the MPEG encoder 75 except a start of the search represents only a sequence of alternate I frames $I_5$, $I_3$, $I_1$, . . . . In the case where the jump-related time NR corresponds to three times the interval between adjacent I frames, the recovered video information outputted from the MPEG encoder 75 except a start of the search represents only a sequence of I frames $I_5$, $I_2$, $I_{-1}$, . . . .

Figure 6:
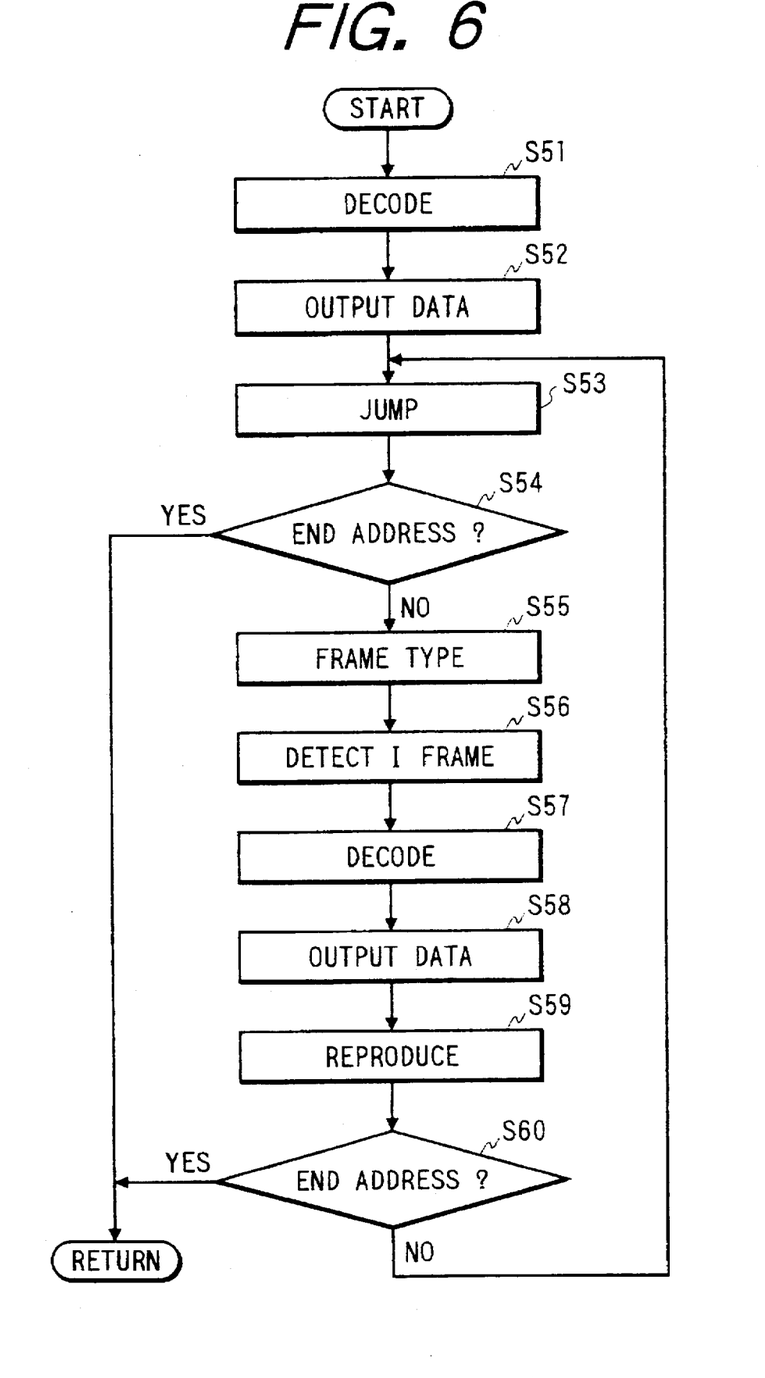
FIG. 6 is a third segment of the program for controlling the CPU in FIG. 2.

FIG. 6 is a flowchart of the third segment of the program for controlling the CPU 30. The third program segment corresponds to the third search mode of operation. The third search mode of operation agrees with a search in a normal direction (the forward playback direction), and relates to I frames and subsequent other frames.

As shown in FIG. 6, a first step S51 of the program segment controls the MPEG decoder 75 to decode the reproduced signal representing the current frame (the current address). A step S52 following the step S51 controls the MPEG decoder 75 to write the decoding-resultant data into the memory within the MPEG decoder 75. The step S52 controls the MPEG decoder 75 so that the decoding-resultant data will be outputted from the memory to the video signal processing circuit 76 (or the audio signal processing circuit 80). After the step S52, the program advances to a step S53.

The step S53 sets a jump destination address which follows the current address by a given address interval. The jump destination address corresponds to a position on the video CD which exists outward of the current address position. The step S53 informs the CPU 3 of the jump destination address. As a result, the CPU 3 generates and outputs a control signal to the CD decoder/servo control circuit 5 in response to the information of the jump destination address. Therefore, as previously described, the optical pickup head 2B is jumped from the current position to a new position corresponding to the jump destination address. Thus, a position on the video CD which corresponds to the jump destination address is accessed and scanned by the optical pickup head 2B.

A step S54 following the step S53 decides whether or not the jump destination address exceeds an end address. When the jump destination address does not exceed the end address, the program advances from the step S54 to a step S55. When the jump destination address exceeds the end address, the program exits from the step S54 and then returns to the main routine.

The step S55 receives information of the type of the current frame from the MPEG decoder 75. A step S56 following the step S55 decides whether or not the current frame is an I frame by referring to the information of the type of the current frame. The step S56 waits until the current frame becomes an I frame. When the current frame becomes an I frame, the program advances from the step S56 to a step S57.

The step S57 controls the MPEG decoder 75 to decode the reproduced signal representing the current frame (the I frame). A step S58 following the step S57 controls the MPEG decoder 75 to write the decoding-resultant data into the memory within the MPEG decoder 75. The step S58 controls the MPEG decoder 75 so that the decoding-resultant data will be outputted from the memory to the video signal processing circuit 76 (or the audio signal processing circuit 80).

A step S59 following the step S58 controls the MPEG decoder 75 to decode the reproduced signal sequentially representing a given number of frames (P and B frames) following the last I frame. Further, the step S59 controls the MPEG decoder 75 so that the decoding-resultant data is periodically written into the memory within the MPEG decoder 75, and that the decoding-resultant data is periodically outputted from the memory to the video signal processing circuit 76 (or the audio signal processing circuit 80). The decoding-resultant data representing the last frame is repetitively outputted from the memory.

A step S60 following the step S59 decides whether or not the current address corresponding to the current frame reaches the end address. When the current address does not reach the end address, the program returns from the step S60 to the step S53. When the current address reaches the end address, the program exits from the step S60 and then returns to the main routine.

With reference to FIGS. 1 and 6, at a moment $t_1$, an I frame $I_1$ is detected by the step S56. At a moment $t_2$ following the moment $t_1$, the MPEG decoder 75 decodes the reproduced signal representing the I frame $I_1$ (the step S57). The decoding-resultant data is written into the memory within the MPEG decoder 75, and the decoding-resultant data is outputted from the memory to the video signal processing circuit 76 (the step S58). Then, the reproduced signal sequentially representing the given number of frames (P and B frames) following the last I frame is periodically decoded. The decoding-resultant data is periodically written into the memory within the MPEG decoder 75, and the decoding-resultant data is periodically outputted from the memory to the video signal processing circuit 76 (or the audio signal processing circuit 80). The decoding-resultant data representing the last frame is repetitively outputted from the memory (the step 59). A jump destination address is calculated, and the optical pickup head 2B is jumped to a position immediately preceding the position corresponding jump destination address (the step S53). Subsequently, a next I frame $I_2$ is detected by the step S56. Then, the above-indicated processes are repeated. In this way, the recovered video information outputted from the MPEG encoder 75 represents only a sequence of an I frame $I_1$, P and B frames, an I frame $I_2$, P and B frames, and an I frame $I_3$, P and B frames, . . . .

With reference to the portions (B) and (D) of FIG. 4, the updating of the contents of the I-frame-related data outputted from the memory within the MPEG decoder 75 to the video signal processing circuit 76 is controlled by a fixed-frequency pulse signal having a given period equal to, for example, 0.25 second. Specifically, the updating of the I-frame-related data is executed at every timing (for example, a moment $t_3$ and a moment $t_5$) determined by the fixed-frequency pulse signal. The fixed-frequency pulse signal has a waveform such has shown in the portion (D) of FIG. 4. The return from the step S60 to the step S53 is synchronized with the fixed-frequency pulse signal. As shown in the portions (B) and (D) of FIG. 4, each new-I-frame data appears at every timing determined by the fixed-frequency pulse signal.

As shown in the portion (B) of FIG. 4, the recovered video information representing the I frame $I_1$ is outputted from the MPEG decoder 75 at a moment $t_3$. Then, the recovered video information sequentially representing the given number of P and B frames following the I frame $I_1$ is outputted from the MPEG decoder 75 until a moment $t_4$ following the moment $t_3$. The recovered video information representing the last frame continues to be repetitively outputted during the time interval between the moment $t_4$ and a subsequent moment $t_5$ which is denoted by "HOLD", At the moment $t_5$, the recovered video information representing the I frame $I_2$ is outputted from the MPEG decoder 75. In the portion (B) of FIG. 4, the last-frame data continues to be repetitively outputted during each of time intervals denoted by "HOLD".

Figure 7:
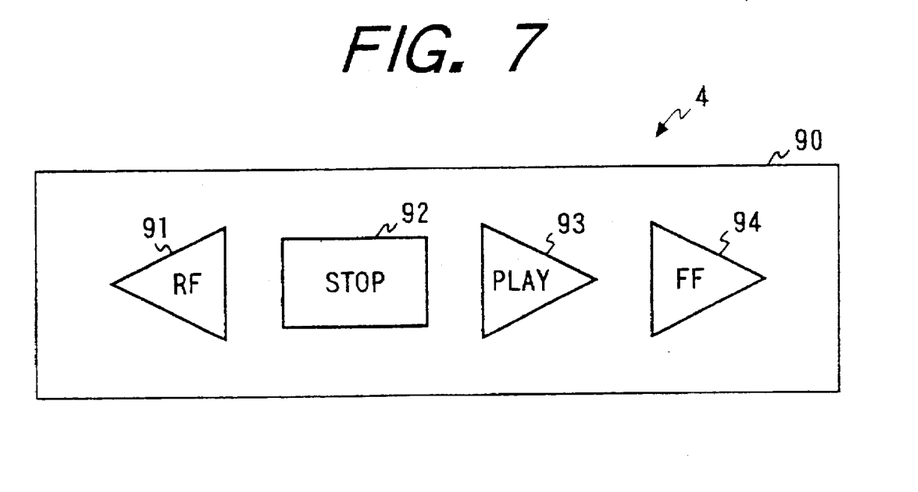
FIG. 7 is a plan view of an operation panel of a command input section in FIG. 2.

As shown in FIG. 7, the command input section 4 has an operation panel 90 provided with buttons 91, 92, 93, and 94 corresponding to "reverse-direction search", "stop", "play", and "forward-direction search" respectively. The operation panel 90 is provided on a main body of the reproducing apparatus or a remote-control unit of the reproducing apparatus. The operation panel 90 may be further provided with a button corresponding to "pause".

Figure 8:
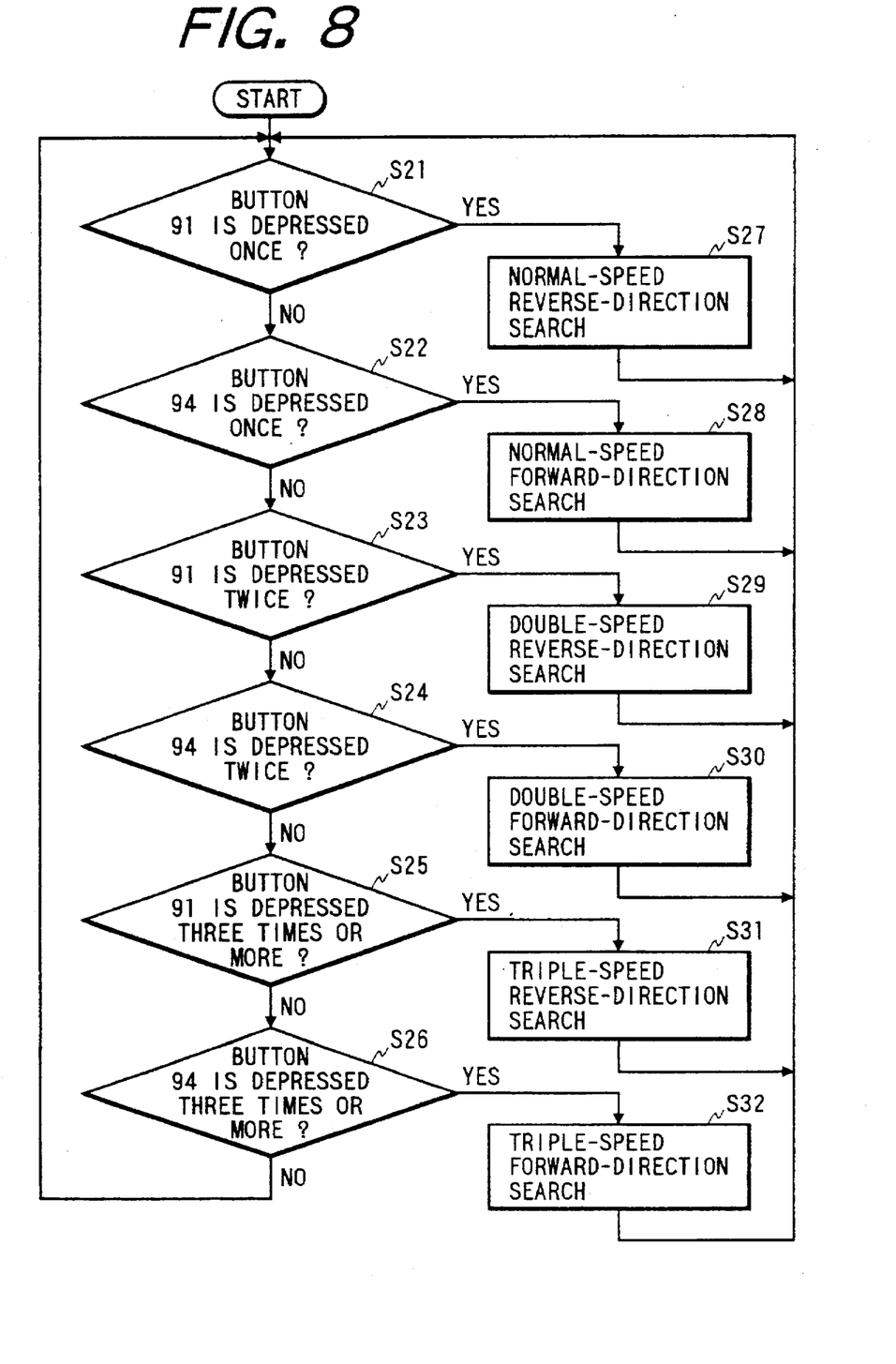
FIG. 8 is a segment of a program for controlling another CPU in FIG. 2.

The CPU 3 monitors conditions of operation of these buttons 91, 92, 93, and 94. As previously described, the CPU 3 operates in accordance with a program stored in the internal ROM. FIG. 8 is a segment of the program which relates to operation of the reverse-direction search button 91 and the forward-direction search button 94.

As shown in FIG. 8, a first step S21 of the program segment decides whether or not the reverse direction search button 91 is depressed only once during a given interval. In the case where the reverse-direction search button 91 is depressed only once during the given interval, the program advances from the step S21 to a step S27. Otherwise, the program advances from the step S21 to a step S22. The step S27 generates a search-mode selection signal corresponding to normal-speed reverse-direction search. Here, "normal-speed" means a normal search speed which is higher than a normal playback speed. The step S27 outputs the generated search-mode selection signal to the CPU 30. After the step S27, the program returns to the step S21.

The step S22 decides whether or not the forward-direction search button 94 is depressed only once during the given interval. In the case where the forward-direction search button 94 is depressed only once during the given interval, the program advances from the step S22 to a step S28. Otherwise, the program advances from the step S22 to a step S23. The step S28 generates a search-mode selection signal corresponding to normal-speed forward-direction search. The step S28 outputs the generated search-mode selection signal to the CPU 30. After the step S28, the program returns to the step S21.

The step S23 decides whether or not the reverse-direction search button 91 is depressed twice during the given interval. In the case where the reverse-direction search button 91 is depressed twice during the given interval, the program advances from the step S23 to a step S29. Otherwise, the program advances from the step S23 to a step S24. The step S29 generates a search-mode selection signal corresponding to double-speed reverse-direction search. The step S29 outputs the generated search-mode selection signal to the CPU 30. After the step S29, the program returns to the step S21.

The step S24 decides whether or not the forward-direction search button 94 is depressed twice during the given interval. In the case where the forward-direction search button 94 is depressed twice during the given interval, the program advances from the step S24 to a step S30. Otherwise, the program advances from the step S24 to a step S25. The step S30 generates a search-mode selection signal corresponding to double-speed forward-direction search. The step S30 outputs the generated search-mode selection signal to the CPU 30. After the step S30, the program returns to the step S21.

The step S25 decides whether or not the reverse-direction search button 91 is depressed at least three times during the given interval. In the case where the reverse-direction search button 91 is depressed at least three times during the given interval, the program advances from the step S25 to a step S31. Otherwise, the program advances from the step S25 to a step S26. The step S31 generates a search-mode selection signal corresponding to triple-speed reverse-direction search. The step S31 outputs the generated search-mode selection signal to the CPU 30. After the step S31, the program returns to the step S21.

The step S26 decides whether or not the forward-direction search button 94 is depressed at least three times during the given interval. In the case where the forward-direction search button 94 is depressed at least three times during the given interval, the program advances from the step S26 to a step S32. Otherwise, the program returns from the step S26 to the step S21. The step S32 generates a search-mode selection signal corresponding to triple-speed forward-direction search. The step S32 outputs the generated search-mode selection signal to the CPU 30. After the step S32, the program returns to the step S21.

As previously described, the control program for the CPU 30 has the first, second, and third segments (sub routines) corresponding to the first, second, and third search modes of operation respectively. One of the first, second, and third segments of the control program for the CPU 30 is selected and executed in response to the search-mode selection signal fed from the CPU 3. In the case where the search-mode selection signal corresponds to one of the normal-speed forward-direction search, the double-speed forward-direction search, and the triple-speed forward-direction search, the first segment of the control program for the CPU 30 which relates to forward-direction search (FIG. 3) is selected and executed. Further, the jump-related time N used in the CPU 30 is set in response to the search-mode selection signal. When the search-mode selection signal corresponds to the normal-speed forward-direction search, the jump-related time N is set so as to correspond to the interval between adjacent I frames. Specifically, the jump-related time N is set to, for example, 0.5 second. When the search-mode selection signal corresponds to the double-speed forward-direction search, the jump-related time N is set so as to correspond to twice the interval between adjacent I frames. Specifically, the jump-related time N is set to, for example, 1.0 second. When the search-mode selection signal corresponds to the triple-speed forward-direction search, the jump-related time N is set so as to correspond to three times the interval between adjacent I frames. Specifically, the jump-related time N is set to, for example, 1.5 seconds. In the case where the search-mode selection signal corresponds to one of the normal-speed reverse-direction search, the double-speed reverse-direction search, and the triple-speed reverse-direction search, the second segment of the control program for the CPU 30 which relates to reverse-direction search (FIG. 5) is selected and executed. Further, the jump-related time NR used in the CPU 30 is set in response to the search-mode selection signal. When the search-mode selection signal corresponds to the normal-speed reverse-direction search, the jump-related time NR is set so as to correspond to the interval between adjacent I frames. Specifically, the jump-related time NR is set to, for example, −0.5 second. When the search-mode selection signal corresponds to the double-speed reverse-direction search, the jump-related time NR is set so as to correspond to twice the interval between adjacent I frames. Specifically, the jump-related time NR is set to, for example, −1.0 second. When the search-mode selection signal corresponds to the triple-speed reverse-direction search, the jump-related time NR is set so as to correspond to three times the interval between adjacent I frames. Specifically, the jump-related time NR is set to, for example, −1.5 seconds.

It should be noted that the reproducing apparatus of this embodiment may be modified to handle a recording medium different from a video CD. An examples of such a recording medium is a DVD, a magnetic tape, or a magnetic disc.

Second Embodiment

A second embodiment of this invention is similar to the embodiment of FIGS. 1–8 except for design changes indicated hereinafter.

In the second embodiment, a CD decoder/servo control circuit 5 (see FIG. 2) controls a spindle motor 2A (see FIG. 2) via a drive amplifier 2 (see FIG. 2) so that a video CD can be rotated at either a normal constant linear velocity or twice the normal constant linear velocity.

In the second embodiment, an MPEG decoder 75 (See FIG. 2) has an ability of processing and transmitting a signal at a rate of, for example, 3 Mbps. While the video CD, that is, a spindle 10 (see FIG. 2) remains rotated at twice the normal constant linear velocity, the time length of every 1-frame segment of a reproduced signal is equal to half a normal time length. Regarding a vertical sync signal, the MPEG decoder 75 is designed to compensate for the increase in the constant linear velocity. Specifically, the MPEG decoder 75 is designed so that a vertical sync signal recovered therein and outputted therefrom has a period equal to a normal period.

Figure 9:
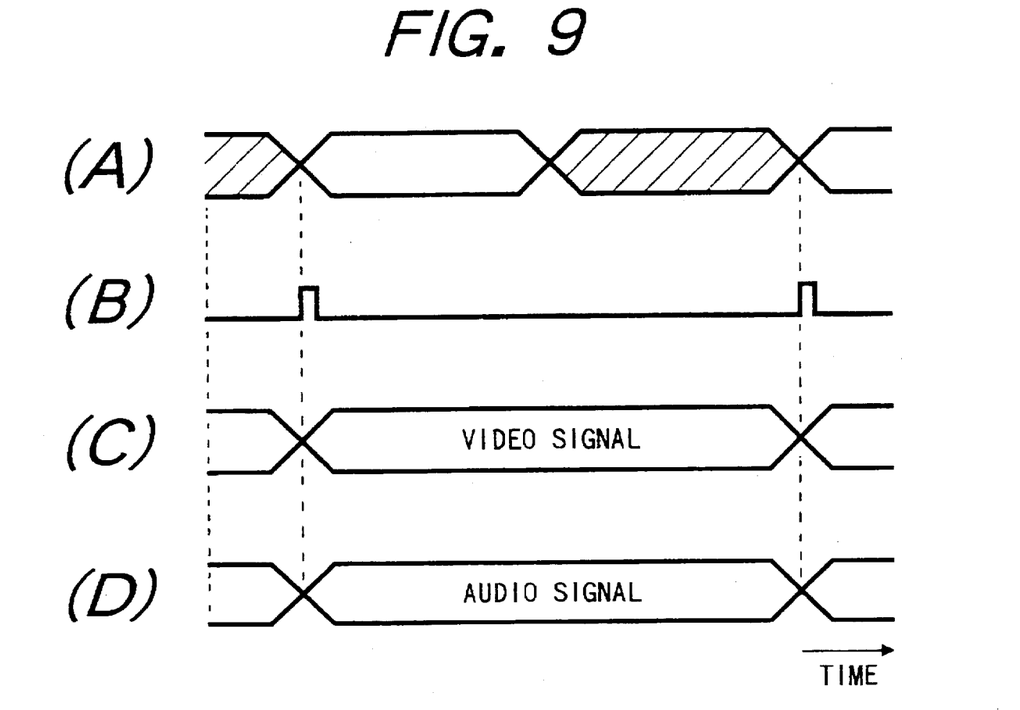
FIG. 9 is a time-domain diagram of signals in a reproducing apparatus according to a second embodiment of this invention.

The portion (A) of FIG. 9 shows a sequence of 1-frame segments of a reproduced signal fed from the CD decoder/servo control circuit 5 to the MPEG decoder 75 during drive of a video CD at twice the normal constant linear velocity. It should be noted that the reproduced signal fed from the CD decoder/servo control circuit 5 to the MPEG decoder 75 represents either video information or audio information. The portion (B) of FIG. 9 shows a waveform of the vertical sync signal which is generated in the MPEG decoder 75 during drive of the video CD at twice the normal constant linear velocity. The portion (C) of FIG. 9 shows conditions of a video signal outputted from the MPEG decoder 75 during drive of the video CD at twice the normal constant linear velocity. The portion (D) of FIG. 9 shows conditions of an audio signal outputted from the MPEG decoder 75 during drive of the video CD at twice the normal constant linear velocity.

With reference to FIG. 9, alternate ones of 1-frames segments of the reproduced signal are latched in response to effective state-changes of the vertical sync signal and are used by the MPEG decoder 75 while the other alternate ones thereof are discarded. In the portion (A) of FIG. 9, used 1-frame segments of the reproduced signal are denoted by hatched regions, and discarded 1-frame segments thereof are denoted by non-hatched regions. Used 1-frame segments of the reproduced signal are expanded and doubled in time length, and are arranged into a sequence of 1-frame segments of a normal-rate reproduced signal. As shown in the portions (B) and (C) of FIG. 9, 1-frame segments of the reproduced signal representing video information are outputted from the MPEG decoder 75 in synchronism with the vertical sync signal. As shown in the portions (B) and (D) of FIG. 9, 1-frame segments of the reproduced signal representing audio information are outputted from the MPEG decoder 75 in synchronism with the vertical sync signal.

Figure 10:
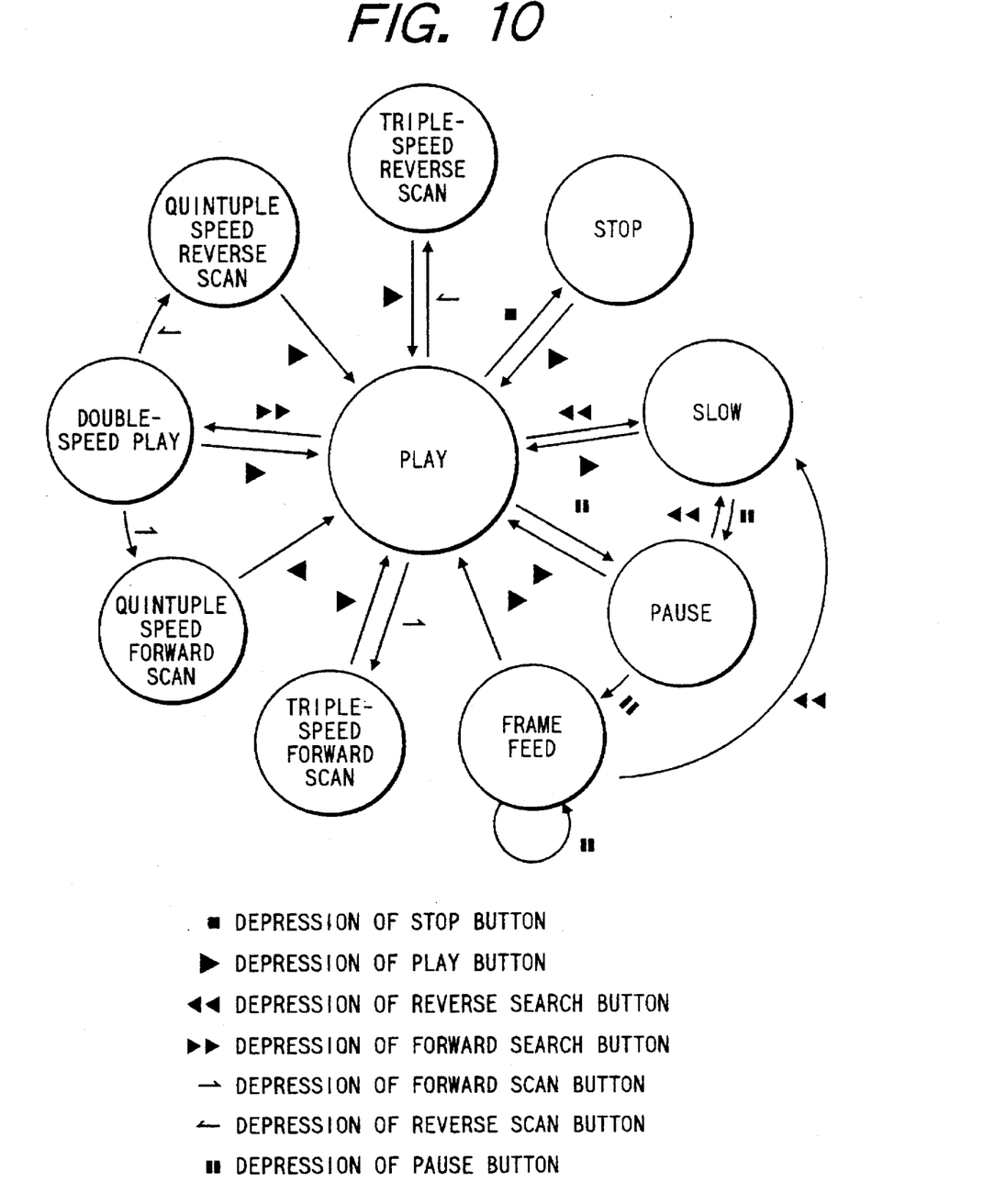
FIG. 10 is a diagram of the relation between modes of operation of the reproducing apparatus and various control buttons in the second embodiment.

In the second embodiment, an operation panel of a command input section 4 (see FIG. 2) has buttons corresponding to "reverse-direction search", "stop", "play", "forward-direction search", "forward-direction scan", "reverse-direction scan", and "pause" respectively. With reference to FIG. 10, operation of a reproducing apparatus in the second embodiment is changed among a play mode, a stop mode, a slow mode, a pause mode, a frame feed mode, a triple-speed forward-direction scan mode, a quintuple-speed forward-direction scan mode, a double-speed play mode, a quintuple-speed reverse-direction scan mode, and a triple-speed reverse-direction scan mode by depressing the buttons of the input section 4.

During the triple-speed scan modes of operation, a video CD remains rotated at the normal constant linear velocity while a jump-related time N is set to correspond to five times the interval between adjacent I frames. In this case, a certain waiting time is spent during the moments of occurrence of jumps of an optical pickup head 2B (see FIG. 2) so that a resultant reproduction speed is equal to about three times a normal search speed rather than the five times the normal search speed.

During the quintuple-speed scan modes of operation, a video CD remains rotated at twice the normal constant linear velocity while the jump-related time N is set to correspond to five times the interval between adjacent I frames.

It should be noted that the reproducing apparatus of the second embodiment may be modified to handle a recording medium different from a video CD. An examples of such a recording medium is a magnetic tape or a magnetic disc.

Third Embodiment

A third embodiment of this invention is similar to the second embodiment thereof except for design changes indicated later. In the third embodiment, during drive of a video CD at twice a normal constant linear velocity, 1-frame segments of a reproduced signal are sequentially written into a DRAM 34 (see FIG. 2), and alternate ones of the 1-frame segments of the reproduced signal are erased from the DRAM 34. The erased 1-frame segments correspond to discarded 1-frame segments while the remaining non-erased 1-frame segments correspond to used 1-frame segments. The non-erased 1-frame segments (the used 1-frame segments) of the reproduced signal are sequentially transferred from an MPEG decoder 75 (see FIG. 2) before being decoded thereby.

Specifically, a flag is set each time the decoding of every 1-frame segment of the reproduced signal by the MPEG decoder 75 has been completed. Every other 1-frame segment of the reproduced signal is erased from the DRAM 34 in response to the flag.

During a normal-direction search mode of operation of a reproducing apparatus, signal segments representing P and B frames following an I frame may also be reproduced.

It should be noted that the reproducing apparatus of the third embodiment may be modified to handle a recording medium different from a video CD. An examples of such a recording medium is a magnetic tape or a magnetic disc.

What is claimed is:

1. An apparatus for a recording medium storing video information representing frames including intra-coded frames which are spaced by intervals, the apparatus comprising:

first means for sequentially accessing different places on the recording medium and sequentially reproducing different segments of the video information therefrom;

second means for, during a search, detecting whether or not a first segment of the video information which is currently reproduced by the first means represents a first one of the intra-coded frames;

third means for, during the search and after the second means detects that the first segment of the video information represents the first one of the intra-coded frames, jumping a place accessed by the first means to a given place on the recording medium and enabling the first means to reproduce a second segment of the video signal therefrom, the second segment representing a second one of the intra-coded frames which differs from the first one of the intra-coded frames, wherein an amount of the jumping of the place accessed by the first means corresponds to a given integer times the intervals between the intra-coded frames;

a button;

fourth means for detecting a number of times of depression of the button during a given length of time; and fifth means for changing the given integer in response to the detected number of times.

2. The apparatus of claim 1, further comprising sixth means for thinning out the segments of the video information which are reproduced by the first means.

3. An apparatus for a recording medium storing video information representing frames including intra-coded frames which are spaced by intervals, the apparatus comprising:

first means for sequentially accessing different places on the recording medium and sequentially reproducing different segments of the video information therefrom;

second means for, during a search, detecting whether or not a first segment of the video information which is currently reproduced by the first means represents a first one of the intra-coded frames;

third means for, during the search and after the second means detects that the first segment of the video information represents the first one of the intra-coded frames, jumping from a place accessed by the first means to a given place on the recording medium and enabling the first means to reproduce a second segment of the video signal therefrom, the second segment representing a second one of the intra-coded frames which differs from the first one of the intra-coded frames, wherein an amount of the jumping from the place accessed by the first means corresponds to a given integer times the intervals between the intra-coded frames;

fourth means for decoding the first segment of the video information which represents the first one of the intra-coded frames into decoding-resultant data;

a memory;

fifth means for writing the decoding-resultant data into the memory; and sixth means for reading out the decoding-resultant data from the memory when the jumping is implemented by the third means.

4. The apparatus of claim 3, further comprising a button, seventh means for detecting a number of times of depression of the button during a given length of time, and eighth means for changing the given integer in response to the detected number of times.

5. The apparatus of claim 3, further comprising seventh means for thinning out the segments of the video information which are reproduced by the first means.

6. An apparatus for a recording medium storing video information representing frames including intra-coded frames and non-intra-coded frames, the intra-coded frames being spaced by intervals, the non-intra-coded frames differing from the intra-coded frames, the apparatus comprising:

first means for sequentially accessing different places on the recording medium and sequentially reproducing different segments of the video information therefrom;

second means for, during a search, detecting whether or not a first segment of the video information which is currently reproduced by the first means represents a first one of the intra-coded frames;

third means for, during the search and after the second means detects that the first segment of the video information represents the first one of the intra-coded frames, enabling the first means to reproduce at least one second segment of the video information which represents a non-intra-coded frame adjacent to the first one of the intra-coded frames;

fourth means for, during the search and after the first means reproduces the second segment of the video information which represents the non-intra-coded frame adjacent to the first one of the intra-coded frames, jumping from a place accessed by the first means to a given place on the recording medium and enabling the first means to reproduce a third segment of the video signal therefrom, the third segment representing a second one of the intra-coded frames which differs from the first one of the intra-coded frames, wherein an amount of the jumping from the place accessed by the first means corresponds to a given integer times the intervals between the intra-coded frames;

fifth means for decoding the first segment of the video information which represents the first one of the intra-coded frames into decoding-resultant data;

a memory;

sixth means for writing the decoding-resultant data into the memory; and seventh means for reading out the decoding-resultant data from the memory when the jumping is implemented by the fourth means.

* * * * *